United States Patent [19]

Schenk

[11] Patent Number: 5,601,953
[45] Date of Patent: Feb. 11, 1997

[54] BATTERY GRIDS

[75] Inventor: Raymond L. Schenk, Marysville, Mich.

[73] Assignee: Venture Enterprises, Incorporated, Grosse Pointe, Mich.

[21] Appl. No.: 492,221

[22] Filed: Jun. 19, 1995

Related U.S. Application Data

[63] Continuation of Ser. No. 249,874, May 26, 1994, abandoned.

[51] Int. Cl.⁶ .................................................. H01M 4/74
[52] U.S. Cl. ............................................ 429/241; 429/211
[58] Field of Search ................................. 429/241, 242, 429/233, 237, 211

[56] References Cited

U.S. PATENT DOCUMENTS

| | | |
|---|---|---|
| 440,216 | 11/1890 | Woolf . |
| 1,069,809 | 8/1913 | Prince . |
| 1,364,760 | 1/1921 | Holland et al. . |
| 1,440,354 | 12/1922 | Hanna ................................. 429/241 X |
| 1,515,279 | 11/1924 | Sato ..................................... 429/241 X |
| 1,687,752 | 10/1928 | Ellery ..................................... 429/241 |
| 2,064,324 | 12/1936 | Schnaubelt ............................. 429/241 |
| 2,503,970 | 4/1950 | Rupp . |
| 2,713,079 | 7/1955 | Carrick et al. . |
| 2,909,586 | 10/1959 | Hagspihl ................................. 429/242 |
| 3,099,899 | 8/1963 | Horn et al. . |
| 3,247,023 | 4/1966 | Geissbauer . |
| 3,249,981 | 5/1966 | Sabatino . |
| 3,453,145 | 7/1969 | Duddy . |
| 3,516,863 | 6/1970 | Willmann et al. . |
| 3,516,864 | 6/1970 | Willmann . |
| 3,556,854 | 1/1971 | Wheadon et al. . |
| 3,738,871 | 6/1973 | Scholle . |
| 3,772,084 | 11/1973 | Scholle . |
| 3,813,300 | 5/1974 | Shima et al. . |
| 3,923,545 | 12/1975 | Margulies et al. . |
| 3,989,539 | 11/1976 | Grabb ..................................... 429/241 |
| 4,221,852 | 9/1980 | Qureshi . |
| 4,221,854 | 9/1980 | Hammar et al. . |
| 4,303,747 | 12/1981 | Bender ................................. 429/211 X |
| 4,320,183 | 3/1982 | Qureshi ................................. 429/211 |
| 4,349,067 | 9/1982 | Wirtz et al. . |
| 5,079,111 | 1/1992 | Wheadon et al. . |
| 5,169,659 | 12/1992 | Fleischmann et al. ............. 429/233 X |

OTHER PUBLICATIONS

B 3 4 6 6 1 3—Date Jan. 28, 1975—U.S. Published Patent Application—Margulies et al.

*Primary Examiner*—Anthony Skapars
*Attorney, Agent, or Firm*—Harness, Dickey & Pierce, P.L.C.

[57] ABSTRACT

An improved battery grid for use in lead-acid batteries has been formed which has resistance to the detrimental effects of grid growth. The improved battery grid has been formed to relieve stress at predetermined locations. Specifically, stress is released by having an overdeveloped reticulum and/or flexible junctions including where the reticulum meets the frame and/or by having either no borders or borders which are released from the reticulum through use of the battery. This battery grid can be a positive grid formed on a continuous casting machine and has a growth relief mechanism to accommodate the condition of imperfect grain formation without interruption of the reticulum.

3 Claims, 3 Drawing Sheets

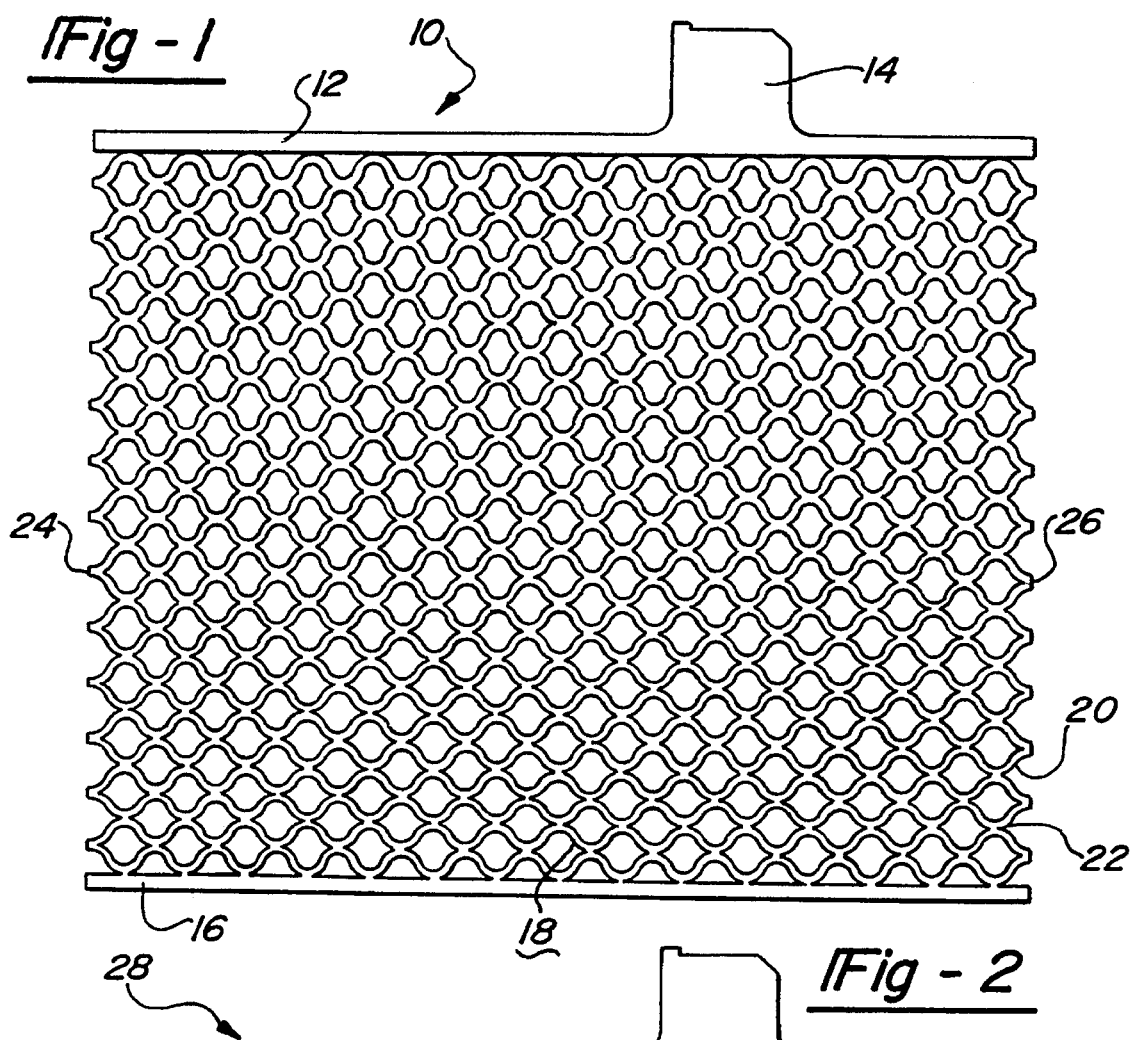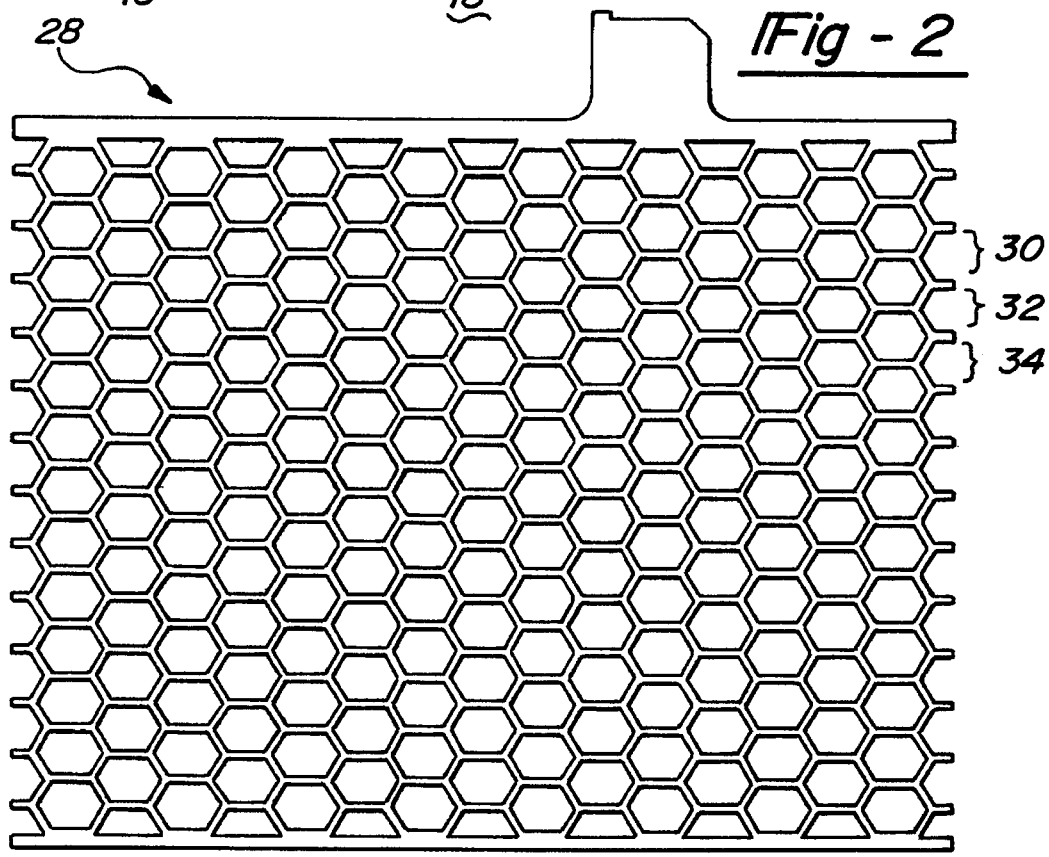

BATTERY GRIDS

This is a continuation of U.S. patent application Ser. No. 08/249,874, filed May 26, 1994, now abandoned.

FIELD OF THE INVENTION

The present invention generally relates to battery grids used in lead-acid batteries and more particularly, to battery grids which release stress at predetermined locations.

BACKGROUND

Lead-acid batteries are a well known source of energy used in a variety of applications including, for example, automotive starting. The central structural elements of conventional lead-acid batteries are positive and negative grids coated with active material to form plates, each having a lug and separated from each other within a battery by porous separators. The grids serve as framework and electrical contact to the positive and negative active materials which generally serve to conduct current. This conjoint electrochemical (corrosion) action and concurrent structural (load-bearing) role cause stress to the grids, particularly the positive grid. Failure of the battery occurs when the grids are no longer able to provide adequate structural support or allow electron flow. Therefore, the primary properties of interest in grid formation and design are strength, resistance to corrosion and mechanical stresses. Other properties to consider include castability, compatibility with the active material (adherence), and electrochemical and metallergic effects. With respect to the latter properties, fluidity and resistance to "hot-tearing" (shrinkage tearing) on solidification and grain formation generally are important.

Traditionally, grids have been constructed to be as constraining as possible. This design resists the dynamic effect of active material shape change and dimensional change in the surface of the grid due to corrosion. This is done by maximizing the cross sectional area of wires and using high tensile alloy materials that are environmentally compatible in a cell. This design invariably becomes a compromise between practical amounts of grid and active material and manufacturing constraints. Typically, the design is such that electron flow is directed in the shortest path to the collecting point or lug. Optimal sized pellets are selected and surrounded with grid material in a pattern to provide the necessary power requirement, and the matrix is thus formed and then framed to facilitate processing.

One method to form such a battery grid is termed book casting. In practicing book casting, a grid is formed in a mold made of two halves, wherein one-half of the mold remains stationary while the other half moves past for ejection of the grid. This process is undesirable because it requires substantial human interplay and one man typically operates 3 molds which produce a total of 60 grids a minute 80% of the time.

Methods have been developed to overcome the undesirableness of book casting such as a method termed expanded metal. This method is illustrated in U.S. Pat. Nos. 3,853,626; 4,247,970; and 4,271,586. Generally, a basic strip of lead typically 0.040 inches thick and 3 inches wide is lanced to form a skeleton material, structurally very weak. Without side frames the material is very difficult to process. The manufacturing rates utilizing this process have been known to reach 200 to 300 grids a minute. However, this method is undesirable due to the costliness of having to form the required grid strip prior to expansion. Additionally, this method does not lend itself to versatility in grid design and grids must be framed to process.

Another more desirable method to cast grids is termed continuous casting (con-casting), disclosed in U.S. Pat. No. 4,349,067. This method allows grids to be cast continuously and directly thus eliminating the need for any mechanical manipulation such as expansion. The grids can, for example, be formed from ingot lead into continuous strips of grids at rates of 200 to 300 grids a minute. The current process is undesirable however to form positive grids because of metallurgic effects resulting in improper grain formation leading to increased corrosion and mechanical stress on the grid. Positive grids differ from negative grids generally in that positive grids require greater strength due to anodic attack, and thus are generally formed with an increased cross-section width in comparison to negative grids. However, increased mold depth is not conducive to con-casting because grain formation is disrupted due to preferential cooling and turbulence caused by the con-casting machine. Imperfect grain formation is undesirable because preferred grain boundary attack leads to non-uniform corrosion. Corrosion and mechanical stresses lead to a swelling effect in the material due to growth of intergranular corrosion products, and give rise to apparent "growth" of grids in service causing the grid to distort until it becomes dysfunctional. Similarly, positive grids formed from metal expansion suffer such undesirable metallurgic properties. Additionally, current con-casting methods utilize wires having a trapezoidal shape which also contribute to poor performance and economical disadvantages of positive grids formed by current con-casting methods.

It would thus be desirable to provide a battery grid which can relieve stress at predetermined locations. It would further be desirable to provide a positive battery grid with a growth relief mechanism to accommodate the condition of imperfect grain formation without the interruption of the reticulum and structured such that it is easy to process. It would further be desirable to provide such a battery grid produced quickly, economically and efficiently.

SUMMARY

An improved battery grid for use in lead-acid batteries has been provided which has resistance to the detrimental effects of grid growth. Corrosion and mechanical stresses on battery grids, particularly positive grids, cause grid growth and eventually lead to battery failure. The present invention is a battery grid which relieves stress at predetermined locations. The present invention further provides a positive grid which can be formed on a continuous casting machine and has a growth relief mechanism to accommodate the condition of imperfect grain formation without interruption of the reticulum.

In one preferred embodiment, a battery grid used in lead-acid batteries comprises a top frame, a lug extending from said top frame, a bottom border extending essentially parallel to said top frame opposite said lug, and a reticulum in between and connecting said top frame and said bottom border, said reticulum formed from a series of non-linear members.

In another preferred embodiment of the present invention, a battery grid used in lead-acid batteries comprises a top frame, a lug extending from said top frame, and a bottom border extending essentially parallel to said top frame opposite said lug. This grid also has a reticulum, having a left end and a right end, which extends in between and connects said top frame to said bottom border, a left side border extending from said top frame to said bottom border at said left end, and a right side border extending from said top frame to said bottom border at said right end, wherein said left side border and said right side border are non-uniform in strength.

In yet another preferred embodiment of the present invention, a battery grid used in lead-acid batteries comprises a top frame, a lug extending from said top frame, a bottom border extending essentially parallel to said top frame opposite said lug, and a reticulum having a left end and a right end, wherein said reticulum extends in between and connects said top frame to said bottom border. The reticulum is formed from a series of members connecting with said top frame and said bottom border at flexible junctions to relieve stress.

Additional objects, advantages, and features of the present invention will become apparent from the following description and appended claims, taken in conjunction with the accompanying drawings.

BRIEF DESCRIPTION OF THE DRAWINGS

FIG. 1 is a preferred embodiment of the battery grid of the present invention.

FIG. 2 is an alternative preferred embodiment of the battery grid of the present invention.

DETAILED DESCRIPTION OF THE PREFERRED EMBODIMENTS

Figure 3:
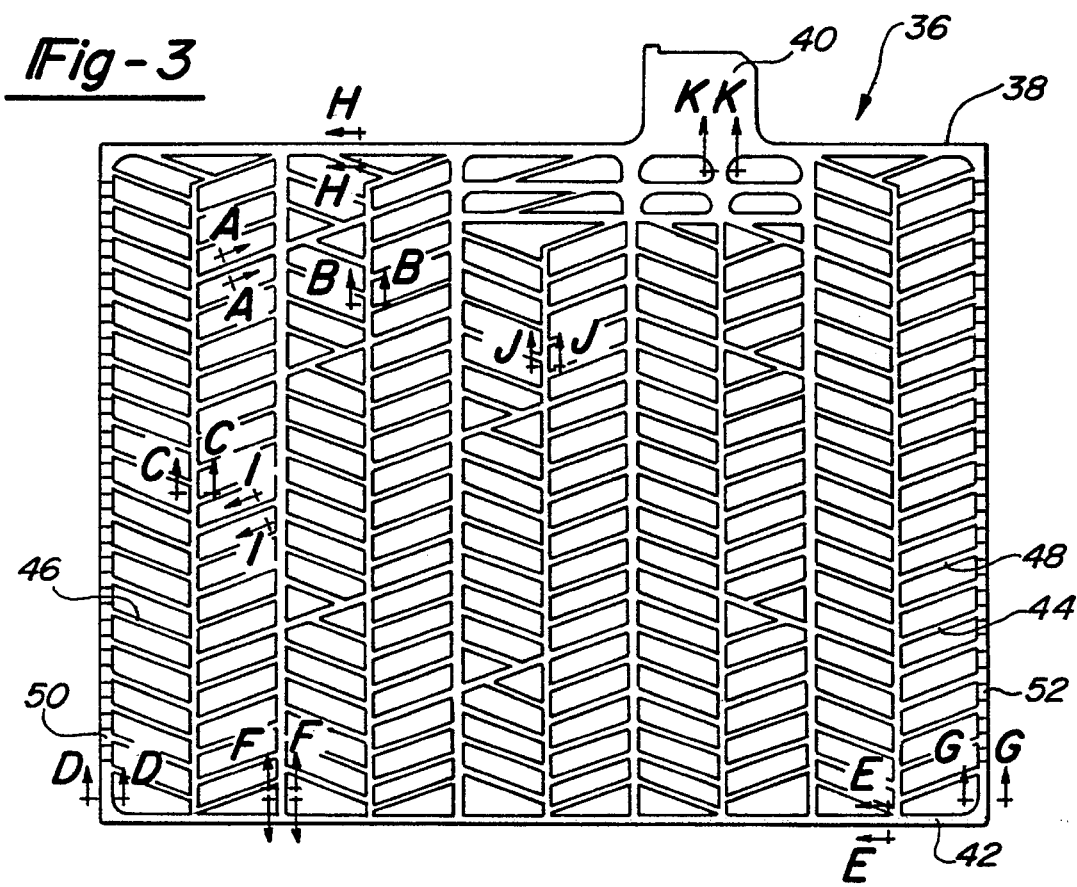
FIG. 3 is an alternative preferred embodiment of the battery grid of the present invention.

Now referring to FIG. 1, a preferred embodiment of the battery grid of the present invention is indicated generally by the numeral 10. Battery grid 10 comprises a top frame 12, a lug 14 extending from top frame 12, a bottom border 16 extending essentially parallel to top frame 12 opposite lug 14, and a reticulum 18 in between and connecting top frame 12 and bottom border 16. Reticulum 18 is formed to relieve stress. In FIG. 1, the reticulum is formed from a series of non-linear members such as member 20. The series of members are overdeveloped in length such to release stress generally known to cause grid growth. In FIG. 1, the series of non-linear members intersect at sinusoidal junctions such as sinusoidal junction 22. Sinusoidal, as used herein, is meant to refer to something having a curve, not necessarily a sine curve. It is further contemplated in the present invention that reticulum 18 has a left side 24 and a right side 26 which are non-linear.

Now referring to FIG. 2, an alternative preferred embodiment of the battery grid of the present invention is indicated generally by the numeral 28. This embodiment is similar to that shown in FIG. 1, except that the reticulum is formed from a series of non-linear members which have a pentagonal pattern. Uninterrupted series of rows of pentagons are shown at 30, 32 and 34.

Figure 3A:
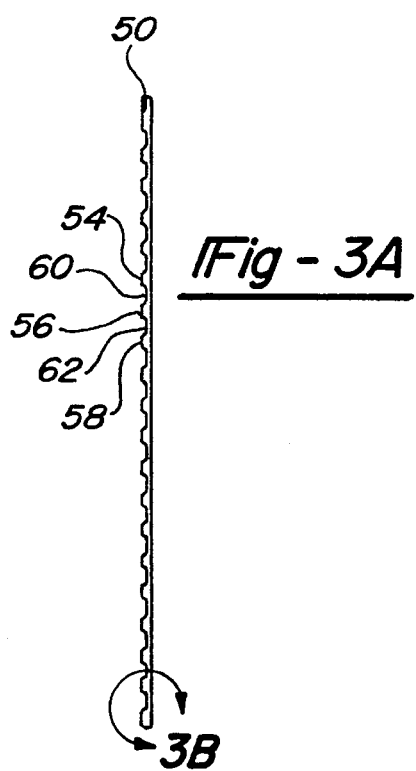
FIG. 3A is a side view of FIG. 3.
Figure 3B:
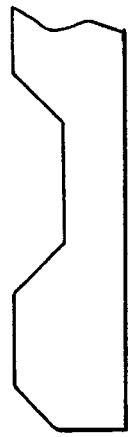
FIG. 3B is an enlargement of a partial depiction of FIG. 3A.
Figure 3C:
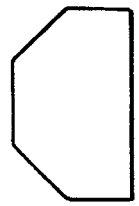
FIG. 3C is an alternative preferred embodiment of FIG. 3B.

Now referring to FIG. 3, an alternative preferred embodiment of the battery grid of the present invention is indicated generally by the numeral 36. Battery grid 36 comprises a top frame 38, a lug 40 extending from top frame 38, a bottom border 42 extending essentially parallel to top frame 38 opposite lug 40, and a reticulum 44 having a left end 46 and a right end 48. Reticulum 44 extends in between and connects top frame 38 to bottom border 42. Battery grid 36 also can have a left side border 50 extending from top frame 38 to bottom border 42 at left end 46, and a right side border 52 extending from top frame 38 to bottom border 42 at right end 52. In one preferred embodiment, left side border 50 and right side border 52 are non-uniform in strength. FIG. 3A shows a side view of left side border 50 to illustrate an example of non-uniform strength. Points 54, 56, and 58 indicate a greater thickness than points 60 and 62. FIG. 3B shows an enlargement of left side border 50. FIG. 3C shows an alternative embodiment left side border 50 wherein the points 60 and 62 are slits or openings. The non-uniform strength allows stress to be released at the weak points. The weak points thus allow flexibility at predetermined locations such that stress is released without the shape of the reticulum collapsing.

Figure 3D:
FIG. 3D is the cross section H—H of FIG. 3.

FIG. 3D shows the cross section H—H of FIG. 3. Specifically, 3D shows the trapezoidal configuration generally generated by continuous casting machines. Generally in FIG. 3, A—A through L—L depict cross sections of reticulum 44 and the side borders. Grid 36 can be formed such that the members are tapered from top to bottom such that they are thicker in cross section near the top frame and near the lug and thinner near the bottom border. Also, different members have consistently higher areas than others such that flexibility within the reticulum is provided. For example, in FIG. 3, the cross sections L—L, B—B, C—C and J—J have relatively low areas in comparison to the cross sections K—K, D—D and G—G. It is contemplated that in response to corrosion and mechanical stress, the cross section L—L is small enough such that the reticulum is fully released from the constraint of bottom border 42.

Figure 4:
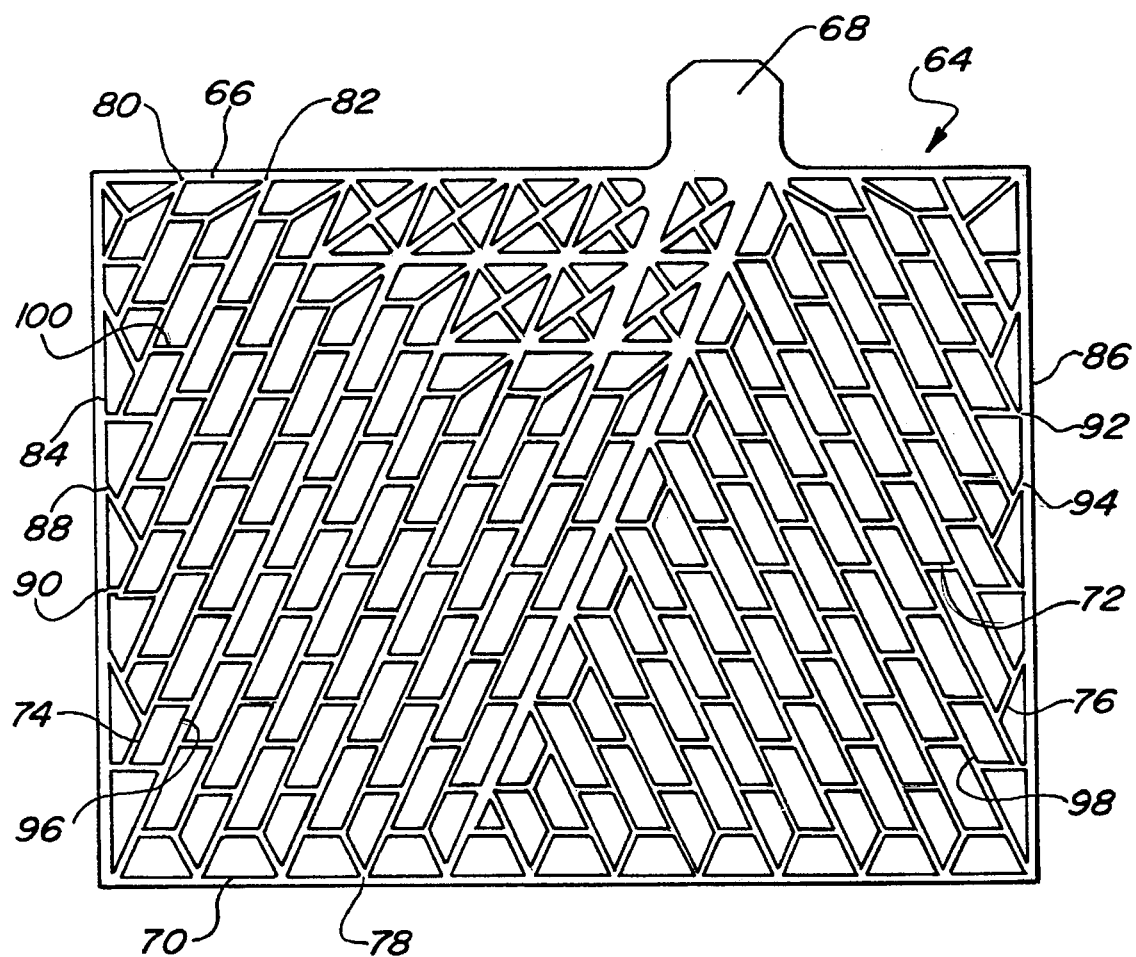
FIG. 4 is an alternative preferred embodiment of the battery grid of the present invention.

Now referring to FIG. 4, an alternative preferred embodiment of the battery grid of the present invention is indicated generally by the numeral 64. Battery grid 64 comprises a top frame 66, a lug 68 extending from top frame 66, and a bottom border 70 extending essentially parallel to top frame 66 opposite lug 68. Grid 64 also has a reticulum 72, having a left end 74 and a right end 76, which extends in between and connects top frame 66 to bottom border 70. Reticulum 72 is formed from a series of members connecting with top frame 66 and bottom border 70 at junctions such as those indicated by numerals 78, 80 and 82. Flexibility is provided at said junctions to relieve stress. Specifically, junctions such as 78, 80 and 82 should have cross sections and designs such that upon application of stress normally leading to grid growth and collapse of the reticulum, the junctions give such that the reticulum is released from the frame to release stress, but the configuration of the reticulum is maintained. In this way, the grid can be processed easily by having a frame, but does not suffer the results of the continued constraints of a frame. It is further contemplated that this embodiment may have left side border 84 and right side border 86 where reticulum 72 joins at flexible junctions such as 88, 90, 92 and 94. The flexibility of said junctions is due to the pattern of reticulum 72 and decreased cross sections at the junctions. FIG. 4 shows an example of a pattern creating flexibility by having a series of members such as 96 and 98 extending diagonally from respective side borders 84 and 86 toward lug 68. The series of members composed of members such as 96 and 98 are connected by a series of discontinuous members such as member 100.

It will be appreciated that grids 14, 28, 36 and 64 all can be formed such that they are tapered to be thicker near the top frame and thinner near the bottom border. This is desirable so that conductivity increases progressively from the bottom border to the lug. It will further be appreciated that the features of each of the grids are interchangeable and all combinations of such features and their variations are contemplated in this invention.

As used herein, the terms "top", "bottom", "right" and "left" are used for convenience of disclosure only and shall not be deemed a limitation on the disclosure, except unless specifically stated so in a particular context.

Whereas a particular embodiment of the invention has been described above, for purposes of illustration, it will be evident to those skilled in the art that numerous variations of the details may be made without departing from the invention as defined in the appended claims.

What is claimed is:

1. A battery grid for use in lead-acid batteries comprising a top frame, a lug extending from said top frame, a bottom border extending essentially parallel to said top frame opposite said lug, a reticulum having a left end and a right end and extending between and connecting said top frame to said bottom border, a left side border extending from said top frame to said bottom border and connected to said left end of said reticulum at a series of junctions, and a right side border extending from said top frame to said bottom border and connected to said right end of said reticulum at a series of junctions, wherein at least one of said left side border and said right side border has a slot formed between a pair of adjacent junctions to relieve stress.

2. The battery grid of claim 1, wherein said slot is formed in each of said left and right side borders.

3. The battery grid of claim 1, wherein said slot is formed between each adjacent pair of junctions.

* * * * *